US012665620B2

(12) United States Patent
Leung et al.

(10) Patent No.: US 12,665,620 B2
(45) Date of Patent: Jun. 23, 2026

(54) TRANSMITTER HARDWARE SHARING

(71) Applicant: QUALCOMM Incorporated, San Diego, CA (US)

(72) Inventors: Lai Kan Leung, San Marcos, CA (US); Bo Yang, San Diego, CA (US); Osama Elhadidy, San Diego, CA (US); Chiewcharn Narathong, Laguna Niguel, CA (US)

(73) Assignee: Qualcomm Incorporated, San Diego, CA (US)

( * ) Notice: Subject to any disclaimer, the term of this patent is extended or adjusted under 35 U.S.C. 154(b) by 536 days.

(21) Appl. No.: 17/934,495

(22) Filed: Sep. 22, 2022

(65) Prior Publication Data

US 2024/0106466 A1     Mar. 28, 2024

(51) Int. Cl.
*H04B 1/00* (2006.01)
*H04B 1/04* (2006.01)

(52) U.S. Cl.
CPC ............. *H04B 1/0067* (2013.01); *H04B 1/04* (2013.01)

(58) Field of Classification Search
CPC .. H04B 1/0067; H04B 1/0071; H04B 1/0075; H04B 1/0082; H04B 1/04
See application file for complete search history.

(56) References Cited

U.S. PATENT DOCUMENTS

| | | | |
|---|---|---|---|
| 7,183,949 B2 | 2/2007 | Park | |
| 9,054,795 B2 | 6/2015 | Choi et al. | |
| 10,673,519 B2 | 6/2020 | Hong et al. | |
| 2018/0310272 A1* | 10/2018 | Younis | H04W 4/33 |
| 2019/0089389 A1 | 3/2019 | Gutman et al. | |
| 2019/0305803 A1* | 10/2019 | Winiecki | H04B 1/48 |
| 2020/0322774 A1* | 10/2020 | Vargas | H04W 4/029 |
| 2022/0201842 A1* | 6/2022 | Pandit | H04B 1/0475 |
| 2022/0271783 A1* | 8/2022 | Gunturi | H03F 3/195 |
| 2023/0038733 A1* | 2/2023 | Blin | H03F 3/245 |

FOREIGN PATENT DOCUMENTS

EP         3860066 A1     8/2021

OTHER PUBLICATIONS (KR 20130119788 A), Lee et al., MIMO System, Method of Converting to Analog Signal in MIMO Transmitter and Method of Converting to Digital Signal in MIMO Receiver, Nov. 2013, pp. 1-23 (Year: 2013).*
International Search Report and Written Opinion—PCT/US2023/073886—ISA/EPO—Dec. 20, 2023.

* cited by examiner

*Primary Examiner* — Keith Ferguson
(74) *Attorney, Agent, or Firm* — Gerald P. Joyce, III

(57)         ABSTRACT

Methods and apparatus for transmitting wireless signals using multiple transmit chains that share hardware components to reduce transmitter circuit area. One example transmitter circuit for wireless communications generally includes a first transmit chain and a second transmit chain. The first transmit chain and the second transmit chain share a digital-to-analog converter (DAC). For certain aspects, the first transmit chain and the second transmit chain may also share a frequency synthesizer and/or a baseband processor.

25 Claims, 12 Drawing Sheets

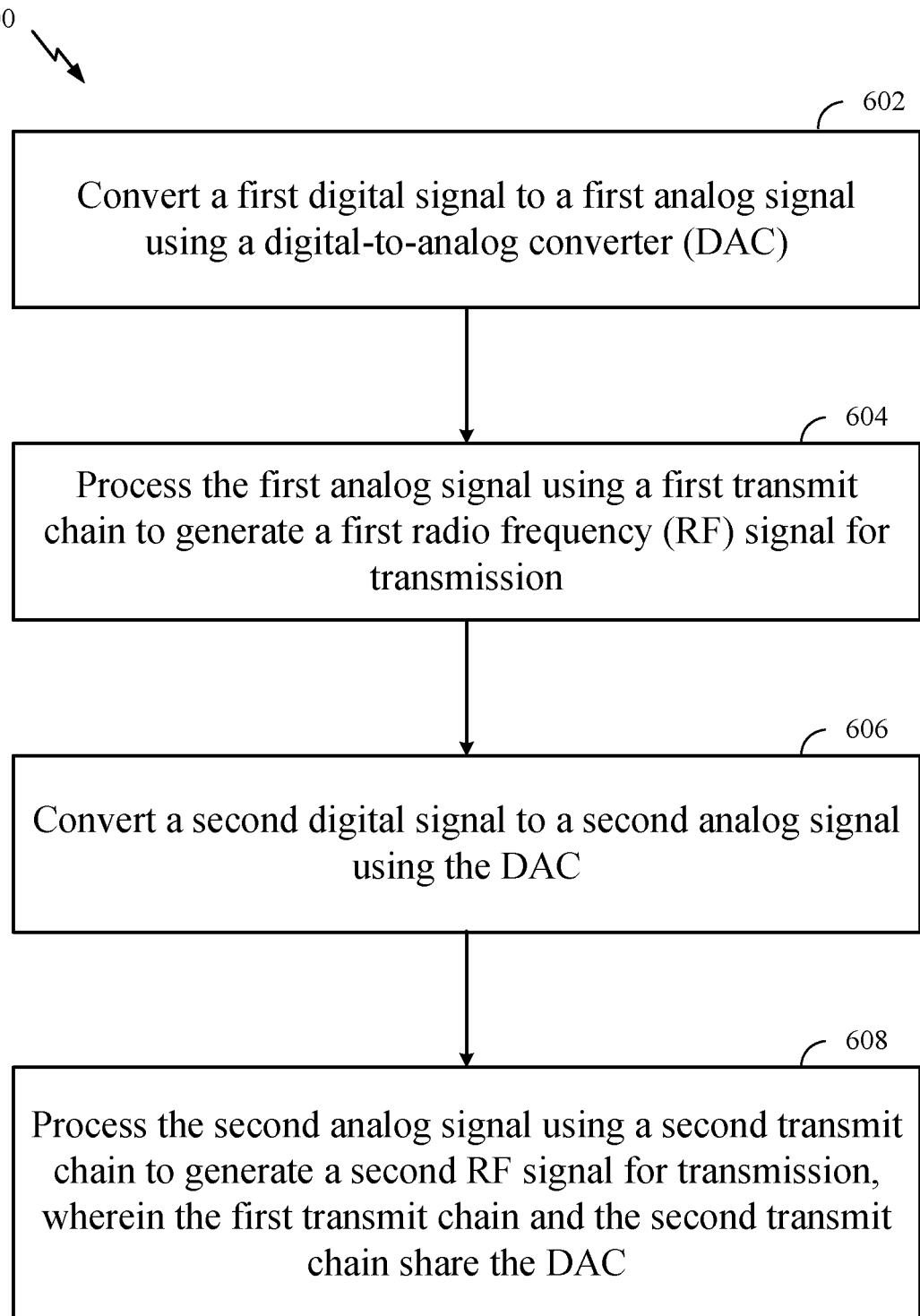

600

602

Convert a first digital signal to a first analog signal
using a digital-to-analog converter (DAC)

604

Process the first analog signal using a first transmit
chain to generate a first radio frequency (RF) signal for
transmission

606

Convert a second digital signal to a second analog signal
using the DAC

608

Process the second analog signal using a second transmit
chain to generate a second RF signal for transmission,
wherein the first transmit chain and the second transmit
chain share the DAC

FIG. 6

TRANSMITTER HARDWARE SHARING

TECHNICAL FIELD

Certain aspects of the present disclosure generally relate to electronic circuits and, more particularly, to sharing hardware components between two or more transmit chains.

BACKGROUND

Wireless communication devices are widely deployed to provide various communication services such as telephony, video, data, messaging, broadcasts, and so on. Such wireless communication devices may transmit and/or receive radio frequency (RF) signals via any of various suitable radio access technologies (RATs) including, but not limited to, 5G New Radio (NR), Long Term Evolution (LTE), Code Division Multiple Access (CDMA), Time Division Multiple Access (TDMA), Wideband CDMA (WCDMA), Global System for Mobility (GSM), Bluetooth, Bluetooth Low Energy (BLE), ZigBee, wireless local area network (WLAN) RATs (e.g., WiFi), Cellular Vehicle-to-Everything (C-V2X), and the like.

A wireless communication network may include a number of base stations that can support communication for a number of mobile stations. A mobile station (MS) may communicate with a base station (BS) via a downlink and an uplink. The downlink (or forward link) refers to the communication link from the base station to the mobile station, and the uplink (or reverse link) refers to the communication link from the mobile station to the base station. A base station may transmit data and control information on the downlink to a mobile station and/or may receive data and control information on the uplink from the mobile station. The base station and/or mobile station may include at least one transceiver, which may include, for example, a plurality of transmit paths designated for transmission using different RATs.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description," one will understand how the features of this disclosure provide advantages that include reduced transmitter circuit area and cost (by eliminating redundant hardware).

Certain aspects of the present disclosure provide a transmitter circuit for wireless communications. The transmitter circuit generally includes a first transmit chain and a second transmit chain. The first transmit chain and the second transmit chain share a digital-to-analog converter (DAC). For certain aspects, the first transmit chain and the second transmit share the DAC and at least one of a frequency synthesizer or a baseband processor.

Certain aspects of the present disclosure provide a method of wireless communication. The method generally includes converting a first digital signal to a first analog signal using a DAC, processing the first analog signal using a first transmit chain to generate a first radio frequency (RF) signal for transmission, converting a second digital signal to a second analog signal using the DAC, and processing the second analog signal using a second transmit chain to generate a second RF signal for transmission. The first transmit chain and the second transmit chain share the DAC.

Certain aspects of the present disclosure provide an apparatus for wireless communication. The apparatus generally includes means for converting a first digital signal to a first analog signal and a second digital signal to a second analog signal, first means for processing the first analog signal to generate a first RF signal for transmission from the apparatus, and second means for processing the second analog signal to generate a second RF signal for transmission from the apparatus. The first means for processing and the second means for processing share the means for converting.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIGS. 5A-5A-1 is a block diagram of an example transmitter circuit with five transmit chains, where a Cellular Vehicle-to-Everything (C-V2X) transmit chain and a millimeter wave (mmW) transmit chain share a DAC and a frequency synthesizer, in accordance with certain aspects of the present disclosure.

FIGS. 5B-5B-1 is a block diagram of an example transmitter circuit with five transmit chains, where a C-V2X transmit chain and a mmW transmit chain share a DAC and a frequency synthesizer and where a sub-6 GHz transmit chain and another mmW transmit chain share another DAC and another frequency synthesizer, in accordance with certain aspects of the present disclosure.

FIG. 6 is a flow diagram of example operations for wireless communication, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Certain aspects of the present disclosure relate to techniques and apparatus for reducing redundancies and saving space on chips by sharing hardware between two or more transmit (TX) chains of a radio frequency (RF) transceiver or transmitter. The hardware components between multiple TX chains may include a digital-to-analog converter (DAC), a frequency synthesizer, and/or a baseband processor.

As used herein, a "baseband processor" generally relates to logic, such as phase control logic and delay control logic, for processing a digital signal received from a modulator-demodulator (modem) before the digital signal is converted by a DAC to an analog signal for upconversion, filtering, amplification, and transmission. A baseband processor may also be referred to as a "digital baseband transmit processor."

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

As used herein, the term "connected with" in the various tenses of the verb "connect" may mean that element A is directly connected to element B or that other elements may be connected between elements A and B (i.e., that element A is indirectly connected with element B). In the case of electrical components, the term "connected with" may also be used herein to mean that a wire, trace, or other electrically conductive material is used to electrically connect elements A and B (and any components electrically connected therebetween).

An Example Wireless System

Figure 1:
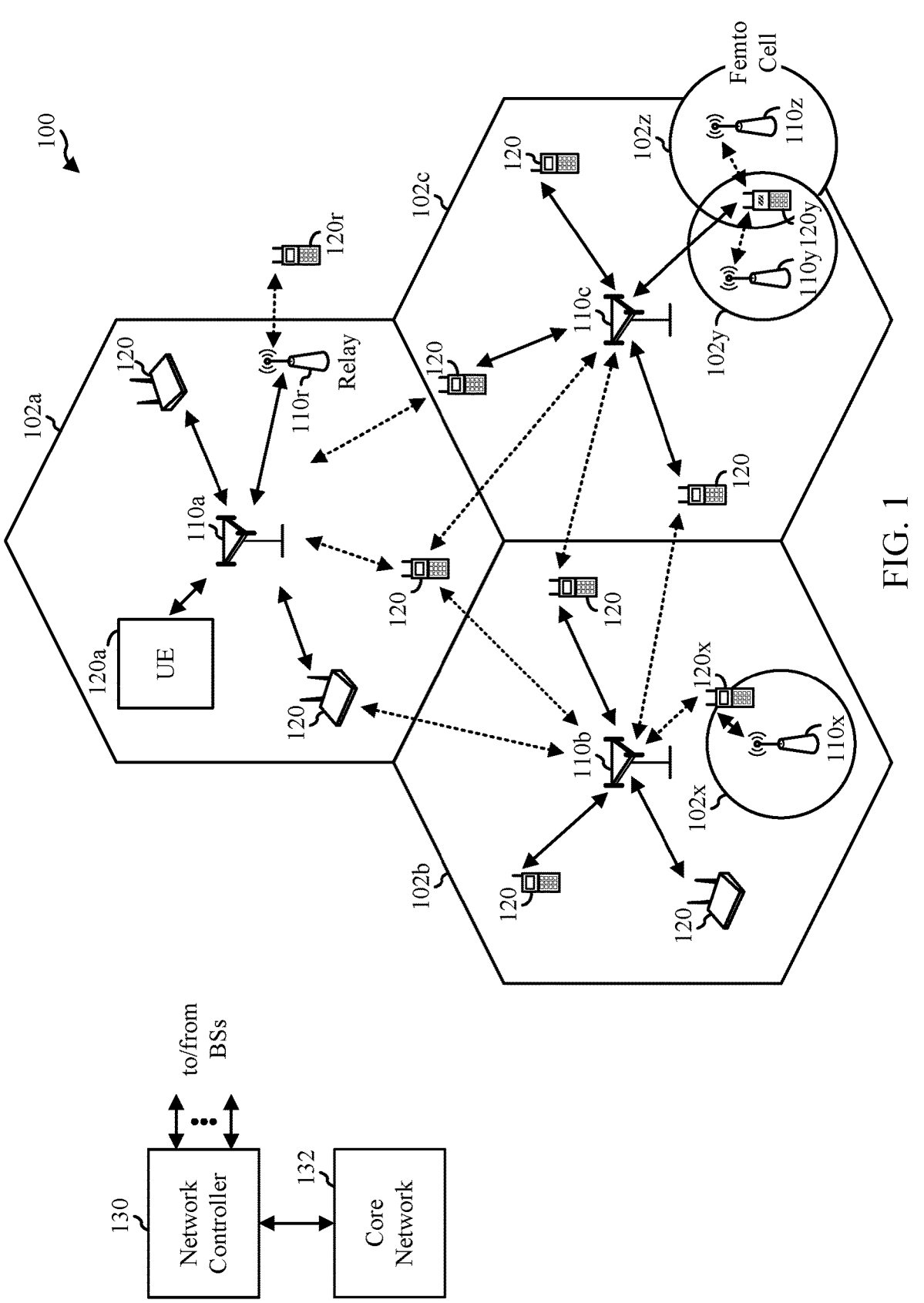
FIG. 1 is a diagram of an example wireless communications network, in which aspects of the present disclosure may be practiced.

FIG. 1 illustrates an example wireless communications network 100, in which aspects of the present disclosure may be practiced. For example, the wireless communications network 100 may be a New Radio (NR) system (e.g., a Fifth Generation (5G) NR network), an Evolved Universal Terrestrial Radio Access (E-UTRA) system (e.g., a Fourth Generation (4G) network), a Universal Mobile Telecommunications System (UMTS) (e.g., a Second Generation/Third Generation (2G/3G) network), or a code division multiple access (CDMA) system (e.g., a 2G/3G network), or may be configured for communications according to an IEEE standard such as one or more of the 802.11 standards, etc.

As illustrated in FIG. 1, the wireless communications network 100 may include a number of base stations (BSs) 110*a-z* (each also individually referred to herein as "BS 110" or collectively as "BSs 110") and other network entities. A BS may also be referred to as an access point (AP), an evolved Node B (eNodeB or eNB), a next generation Node B (gNodeB or gNB), or some other terminology.

A BS 110 may provide communication coverage for a particular geographic area, sometimes referred to as a "cell," which may be stationary or may move according to the location of a mobile BS 110. In some examples, the BSs 110 may be interconnected to one another and/or to one or more other BSs or network nodes (not shown) in wireless communications network 100 through various types of backhaul interfaces (e.g., a direct physical connection, a wireless connection, a virtual network, or the like) using any suitable transport network. In the example shown in FIG. 1, the BSs 110*a*, 110*b*, and 110*c* may be macro BSs for the macro cells 102*a*, 102*b*, and 102*c*, respectively. The BS 110*x* may be a pico BS for a pico cell 102*x*. The BSs 110*y* and 110*z* may be femto BSs for the femto cells 102*y* and 102*z*, respectively. ABS may support one or multiple cells.

The BSs 110 communicate with one or more user equipments (UEs) 120*a-y* (each also individually referred to herein as "UE 120" or collectively as "UEs 120") in the wireless communications network 100. A UE may be fixed or mobile and may also be referred to as a user terminal (UT), a mobile station (MS), an access terminal, a station (STA), a client, a wireless device, a mobile device, or some other terminology. A user terminal may be a wireless device, such as a cellular phone, a smartphone, a personal digital assistant (PDA), a handheld device, a wearable device, a wireless modem, a laptop computer, a tablet, a personal computer, etc.

The BSs 110 are considered transmitting entities for the downlink and receiving entities for the uplink. The UEs 120 are considered transmitting entities for the uplink and receiving entities for the downlink. As used herein, a "transmitting entity" is an independently operated apparatus or device capable of transmitting data via a frequency channel, and a "receiving entity" is an independently operated apparatus or device capable of receiving data via a frequency channel. In the following description, the subscript "dn" denotes the downlink, the subscript "up" denotes the uplink. $N_{up}$ UEs may be selected for simultaneous transmission on the uplink, $N_{dn}$ UEs may be selected for simultaneous transmission on the downlink. $N_{up}$ may or may not be equal to $N_{dn}$, and $N_{up}$ and $N_{dn}$ may be static values or can change for each scheduling interval. Beam-steering or some other spatial processing technique may be used at the BSs 110 and/or UEs 120.

The UEs 120 (e.g., 120x, 120y, etc.) may be dispersed throughout the wireless communications network 100, and each UE 120 may be stationary or mobile. The wireless communications network 100 may also include relay stations (e.g., relay station 110r), also referred to as relays or the like, that receive a transmission of data and/or other information from an upstream station (e.g., a BS 110a or a UE 120r) and send a transmission of the data and/or other information to a downstream station (e.g., a UE 120 or a BS 110), or that relays transmissions between UEs 120, to facilitate communication between devices.

The BSs 110 may communicate with one or more UEs 120 at any given moment on the downlink and uplink. The downlink (i.e., forward link) is the communication link from the BSs 110 to the UEs 120, and the uplink (i.e., reverse link) is the communication link from the UEs 120 to the BSs 110. A UE 120 may also communicate peer-to-peer with another UE 120.

The wireless communications network 100 may use multiple transmit and multiple receive antennas for data transmission on the downlink and uplink. BSs 110 may be equipped with a number $N_{ap}$ of antennas to achieve transmit diversity for downlink transmissions and/or receive diversity for uplink transmissions. A set $N_u$ of UEs 120 may receive downlink transmissions and transmit uplink transmissions. Each UE 120 may transmit user-specific data to and/or receive user-specific data from the BSs 110. In general, each UE 120 may be equipped with one or multiple antennas. The $N_u$ UEs 120 can have the same or different numbers of antennas.

The wireless communications network 100 may be a time division duplex (TDD) system or a frequency division duplex (FDD) system. For a TDD system, the downlink and uplink share the same frequency band. For an FDD system, the downlink and uplink use different frequency bands. The wireless communications network 100 may also utilize a single carrier or multiple carriers for transmission. Each UE 120 may be equipped with a single antenna (e.g., to keep costs down) or multiple antennas (e.g., where the additional cost can be supported).

A network controller 130 (also sometimes referred to as a "system controller") may be in communication with a set of BSs 110 and provide coordination and control for these BSs 110 (e.g., via a backhaul). In certain cases (e.g., in a 5G NR system), the network controller 130 may include a centralized unit (CU) and/or a distributed unit (DU). In certain aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

In certain aspects of the present disclosure, the BSs 110 and/or the UEs 120 may include a transmitter circuit in which two or more transmit chains share a digital-to-analog converter (DAC), as described in more detail herein. These transmit chains may also share a frequency synthesizer and/or a baseband processor.

Figure 2:
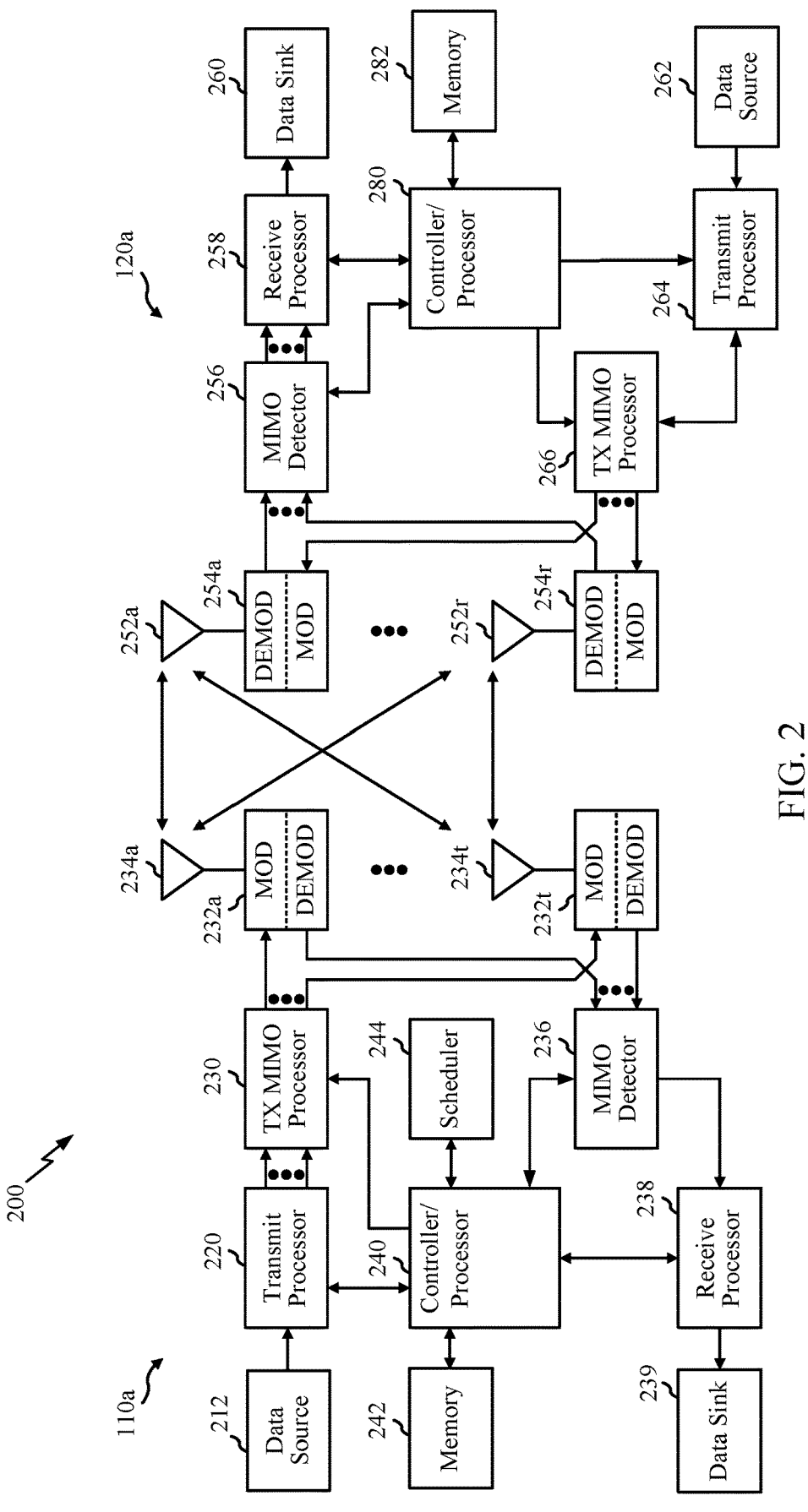
FIG. 2 is a block diagram conceptually illustrating a design of an example a base station (BS) and user equipment (UE), in which aspects of the present disclosure may be practiced.

FIG. 2 illustrates example components of BS 110a and UE 120a (e.g., from the wireless communications network 100 of FIG. 1), in which aspects of the present disclosure may be implemented.

On the downlink, at the BS 110a, a transmit processor 220 may receive data from a data source 212, control information from a controller/processor 240, and/or possibly other data (e.g., from a scheduler 244). The various types of data may be sent on different transport channels. For example, the control information may be designated for the physical broadcast channel (PBCH), physical control format indicator channel (PCFICH), physical hybrid automatic repeat request (HARD) indicator channel (PHICH), physical downlink control channel (PDCCH), group common PDCCH (GC PDCCH), etc. The data may be designated for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a PDSCH, a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS).

A transmit (TX) multiple-input, multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for orthogonal frequency division multiplexing (OFDM), etc.) to obtain an output sample stream. Each of the transceivers 232a-232t may further process (e.g., convert to analog, amplify, filter, and upconvert) the output sample stream to obtain a downlink signal. Downlink signals from the transceivers 232a-232t may be transmitted via the antennas 234a-234t, respectively.

At the UE 120a, the antennas 252a-252r may receive the downlink signals from the BS 110a and may provide received signals to the transceivers 254a-254r, respectively. The transceivers 254a-254r may condition (e.g., filter, amplify, downconvert, and digitize) a respective received signal to obtain input samples. Each demodulator (DEMOD) in the transceivers 232a-232t may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH)) from the controller/processor 280. The transmit processor 264 may also generate reference symbols for a reference signal (e.g., the sounding reference signal (SRS)). The symbols from the transmit processor 264 may be precoded by a TX MIMO processor 266 if applicable, further processed by the modulators (MODs) in transceivers 254a-254r (e.g., for single-carrier frequency division multiplexing (SC-FDM), etc.), and transmitted to the BS 110a. At the BS 110a, the uplink signals from the UE 120a may be received by the antennas 234, processed by the demodulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. The memories 242 and 282 may also interface with the controllers/processors 240 and 280, respectively. A scheduler 244 may schedule UEs for data transmission on the downlink and/or uplink.

Antennas 252, processors 258, 264, 266, and/or controller/processor 280 of the UE 120a and/or antennas 234, processors 220, 230, 238, and/or controller/processor 240 of the BS 110a may be used to perform the various techniques and methods described herein.

In certain aspects of the present disclosure, the transceivers 232 and/or the transceivers 254 may include a transmitter circuit in which two or more transmit chains share a digital-to-analog converter (DAC), as described in more detail herein. In certain aspects, the two or more transmit chains may also share a frequency synthesizer and/or a baseband processor.

Example RF Transceiver

Figure 3:
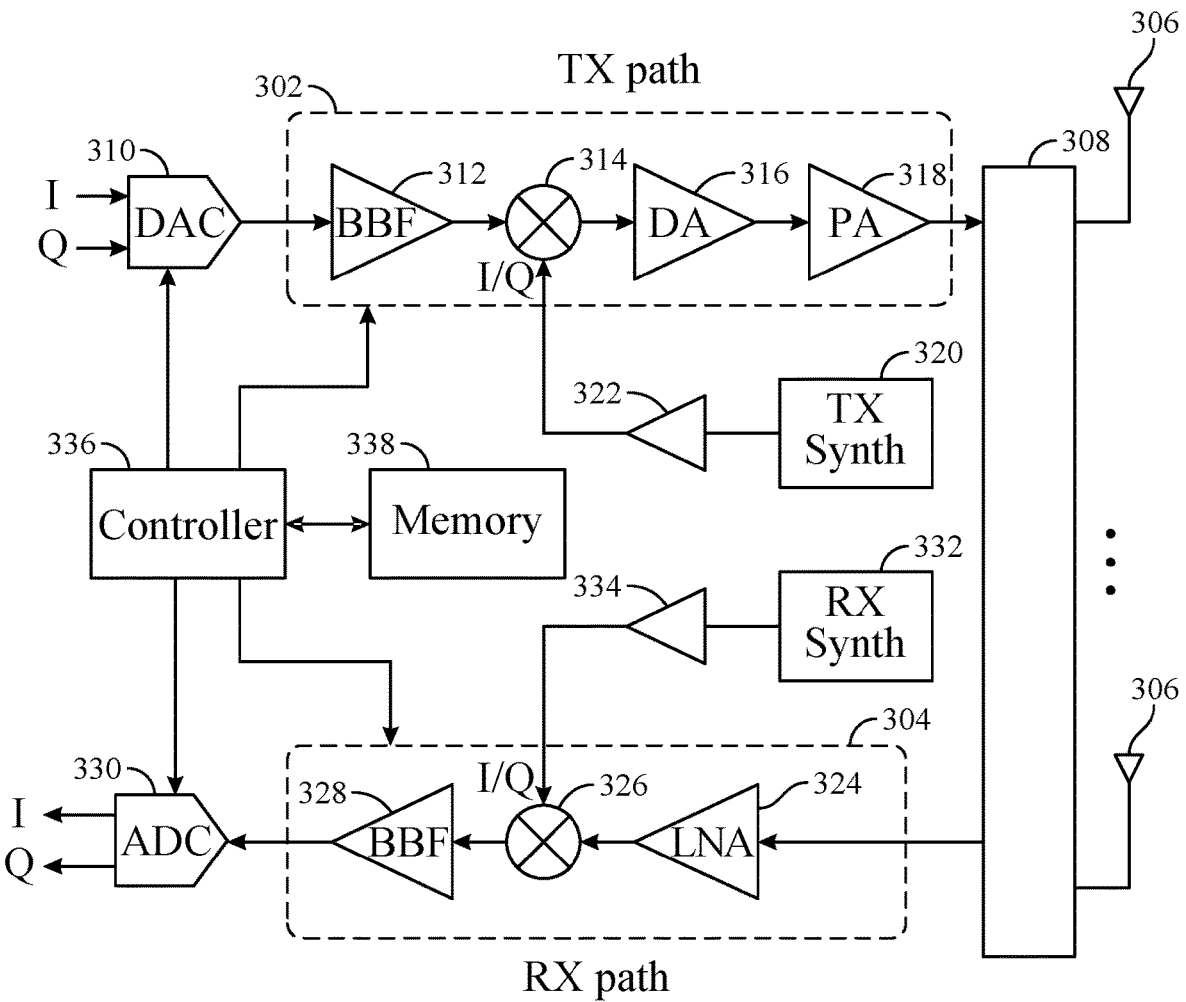
FIG. 3 is a block diagram of an example radio frequency (RF) transceiver, in which aspects of the present disclosure may be practiced.

FIG. 3 is a block diagram of an example radio frequency (RF) transceiver circuit 300, in accordance with certain aspects of the present disclosure. The RF transceiver circuit 300 includes at least one transmit (TX) path 302 (also known as a "transmit chain") for transmitting signals via one or more antennas 306 and at least one receive (RX) path 304 (also known as a "receive chain") for receiving signals via the antennas 306. When the TX path 302 and the RX path 304 share an antenna 306, the paths may be connected with the antenna via an interface 308, which may include any of various suitable RF devices, such as a switch, a duplexer, a diplexer, a multiplexer, and the like.

Receiving in-phase (I) and/or quadrature (Q) baseband analog signals from a digital-to-analog converter (DAC) 310, the TX path 302 may include a baseband filter (BBF) 312, a mixer 314, a driver amplifier (DA) 316, and a power amplifier (PA) 318. The BBF 312, the mixer 314, the DA 316, and the PA 318 may be included in a radio frequency integrated circuit (RFIC). For certain aspects, the PA 318 may be external to the RFIC.

The BBF 312 filters the baseband signals received from the DAC 310, and the mixer 314 mixes the filtered baseband signals with a transmit local oscillator (LO) signal to convert the baseband signal of interest to a different frequency (e.g., upconvert from baseband to a radio frequency). This frequency-conversion process produces the sum and difference frequencies between the LO frequency and the frequencies of the baseband signal of interest. The sum and difference frequencies are referred to as the "beat frequencies." The beat frequencies are typically in the RF range, such that the signals output by the mixer 314 are typically RF signals, which may be amplified by the DA 316 and/or by the PA 318 before transmission by the antenna(s) 306. While one mixer 314 is illustrated, several mixers may be used to upconvert the filtered baseband signals to one or more intermediate frequencies and to thereafter upconvert the intermediate frequency (IF) signals to a frequency for transmission.

The RX path 304 may include a low noise amplifier (LNA) 324, a mixer 326, and a baseband filter (BBF) 328. The LNA 324, the mixer 326, and the BBF 328 may be included in one or more RFICs, which may or may not be the same RFIC that includes the TX path components. RF signals received via the antenna(s) 306 may be amplified by the LNA 324, and the mixer 326 mixes the amplified RF signals with a receive local oscillator (LO) signal to convert the RF signal of interest to a different baseband frequency (e.g., downconvert). The baseband signals output by the mixer 326 may be filtered by the BBF 328 before being converted by an analog-to-digital converter (ADC) 330 to digital I and/or Q signals for digital signal processing.

Certain transceivers may employ frequency synthesizers with a variable-frequency oscillator (e.g., a voltage-controlled oscillator (VCO) or a digitally controlled oscillator (DCO)) to generate a stable, tunable LO with a particular tuning range. Thus, the transmit LO may be produced by a TX frequency synthesizer 320. The transmit LO may be buffered or amplified by amplifier 322 before being mixed with the baseband signals in the mixer 314. Similarly, the receive LO may be produced by an RX frequency synthesizer 332. The receive LO may be buffered or amplified by amplifier 334 before being mixed with the RF signals in the mixer 326. For certain aspects, a single frequency synthesizer may be used for both the TX path 302 and the RX path 304. In certain aspects, the TX frequency synthesizer 320 and/or RX frequency synthesizer 332 may include a frequency multiplier, such as a frequency doubler, that is driven by an oscillator (e.g., a VCO) in the frequency synthesizer.

A controller 336 (e.g., controller/processor 280 in FIG. 2) may direct the operation of the RF transceiver circuit 300A, such as transmitting signals via the TX path 302 and/or receiving signals via the RX path 304. The controller 336 may be a processor, a digital signal processor (DSP), an application-specific integrated circuit (ASIC), a field-programmable gate array (FPGA) or other programmable logic device (PLD), discrete gate or transistor logic, discrete hardware components, or any combination thereof. A memory 338 (e.g., memory 282 in FIG. 2) may store data and/or program codes for operating the RF transceiver circuit 300. The controller 336 and/or the memory 338 may include control logic (e.g., complementary metal-oxide-semiconductor (CMOS) logic).

Example Transmitter Hardware Sharing

In transmitter hardware, such as a transceiver as described above, each transmit chain (e.g., TX path 302) may comprise one set of dedicated circuit elements, such as a baseband processor (labeled "TXFE" for transmitter front-end processor), a DAC 310, a BBF 312, a mixer 314, a TX frequency synthesizer 320, a DA 316, and a PA 318. Each TX path may include one full set of dedicated elements regardless of the technology used. For example, a single device supporting cellular vehicle-to-everything (C-V2X), 5G sub-6 GHz (sub6 or Frequency Range 1 (FR1)), and 5G millimeter wave (5G mmW or Frequency Range 2 (FR2)) communications may include TX chains that each include an individual set of dedicated circuit elements, such as those listed above.

Even though a transceiver may include multiple TX chains, for certain aspects, a limited number of TX chains may be simultaneously used (e.g., four). Furthermore, certain RATs may be prevented from transmitting simultaneously from a single device. For example, C-V2X and mmW transmit chains may not be enabled concurrently. Therefore, providing a complete set of hardware components (such as a baseband processor, DAC, and/or TX synthesizer) for each and every TX chain may be considered redundant, wastes chip area, and is not cost-efficient. Certain aspects of the present disclosure provide TX paths that can share at least one circuit element to reduce redundancies and save chip area.

Figure 4A:
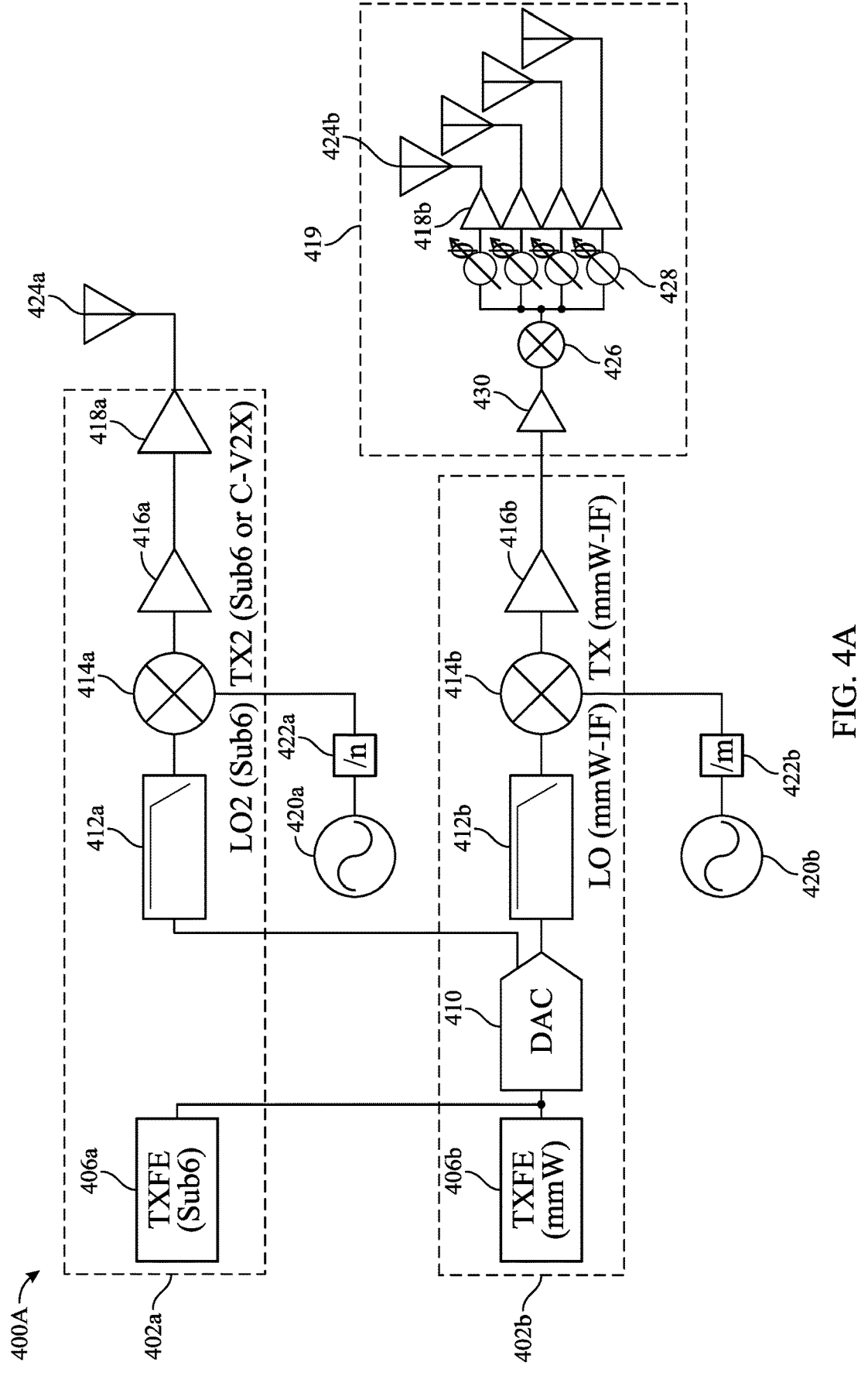
FIG. 4A is a block diagram of an example transmitter circuit with two transmit chains sharing a digital-to-analog converter (DAC), in accordance with certain aspects of the present disclosure.

FIG. 4A is a block diagram of an example transmitter circuit 400A with two transmit (TX) chains sharing a digital-to-analog converter (DAC), in accordance with certain aspects of the present disclosure.

The transmitter circuit 400A may include TX chain 402a and TX chain 402b. In certain aspects, TX chain 402a may be configured for sub-6 GHz communication, and TX chain 402b may be configured for mmW communication. In some aspects, the TX chain 402a may be a sub-6 GHz TX chain designated for C-V2X communication. The TX chains 402a, 402b may each be similar to the transmitter portion of the RF transceiver circuit 300 in FIG. 3. Although TX chain 402a and TX chain 402b are configured to support two different RATs, the TX chain 402a and the TX chain 402b share a common DAC 410.

As illustrated in FIG. 4A, the TX chain 402a may include a baseband processor (TXFE 406a), a BBF 412a, a mixer 414a, a DA 416a, and a PA 418a. The mixer 414a may receive a local oscillator (LO) signal from a TX frequency synthesizer 420a. The BBF 412a may be similar to the BBF 312, the mixer 414a may be similar to the mixer 314, the DA 416a may be similar to the DA 316, the PA 418a may be similar to the PA 318, and the TX frequency synthesizer 420a may be similar to the TX frequency synthesizer 320.

The output of the TXFE 406a may be coupled to the input of the common DAC 410. A first output of the DAC 410 may be coupled to the BBF 412a. The output of the BBF 412a may be coupled to a first input of the mixer 414a. The output of the TX frequency synthesizer 420a may be coupled to a second input of the mixer 414a. For certain aspects, a frequency divider 422a may be coupled between the TX frequency synthesizer 420a and the mixer 414a.

The output of the mixer 414a may be coupled to the input of the DA 416a. The output of the DA 416a may be coupled to the input of the PA 418a, and the output of the PA 418a may be coupled to antenna 424a (e.g., via an interface, such as interface 308). The antenna 424a may be similar to antenna 306.

The TX chain 402b may include each of the electrical components arranged in the same manner as the TX chain 402a, and these components are similarly labeled. One difference between TX chain 402b and TX chain 402a is that, for certain aspects, a second output of the common DAC 410 may be coupled to the BBF 412b. For other aspects, an output of the DAC 410 may be selectively coupled (e.g., through a single-pole, double-throw (SPDT) switch) to the BBF 412a or to the BBF 412b. Another difference between TX chain 402b and TX chain 402a is that the output of the DA 416b of the TX chain 402b is coupled to a phased array 419. The phased array 419 may comprise an amplifier 430 with an input coupled to the DA 416b and an output coupled to an input of a mixer 426. The output of the mixer 426 may be coupled to each input of an array of phase shifters 428. The output of each of the array of phase shifters 428 may be coupled to an input of an array of PAs 418b. The output of each of the array of PAs 418b may be coupled to an array of antennas 424b.

As explained above, because the sub6 path supports C-V2X, and C-V2X and mmW may not be enabled concurrently, the TX chain 402a and the TX chain 402b share common DAC 410. Because only one of the two paths may be enabled at a time, the output of TXFE 406a and TXFE 406b are both coupled to the input of common DAC 410. As described above, a first output of common DAC 410 may be coupled to the input of BBF 412a, and a second output of the common DAC 410 may be coupled to the input of the BBF 412b. Therefore, both TX chains share the common DAC 410, rather than having two separate DACs, which saves chip space.

Although two TX chains are illustrated in FIG. 4A, the transmitter circuit 400A is not limited to only two TX chains. For example, three and or more TX chains may share the same DAC, if these TX chains sharing the same DAC cannot be concurrently enabled.

Figure 4B:
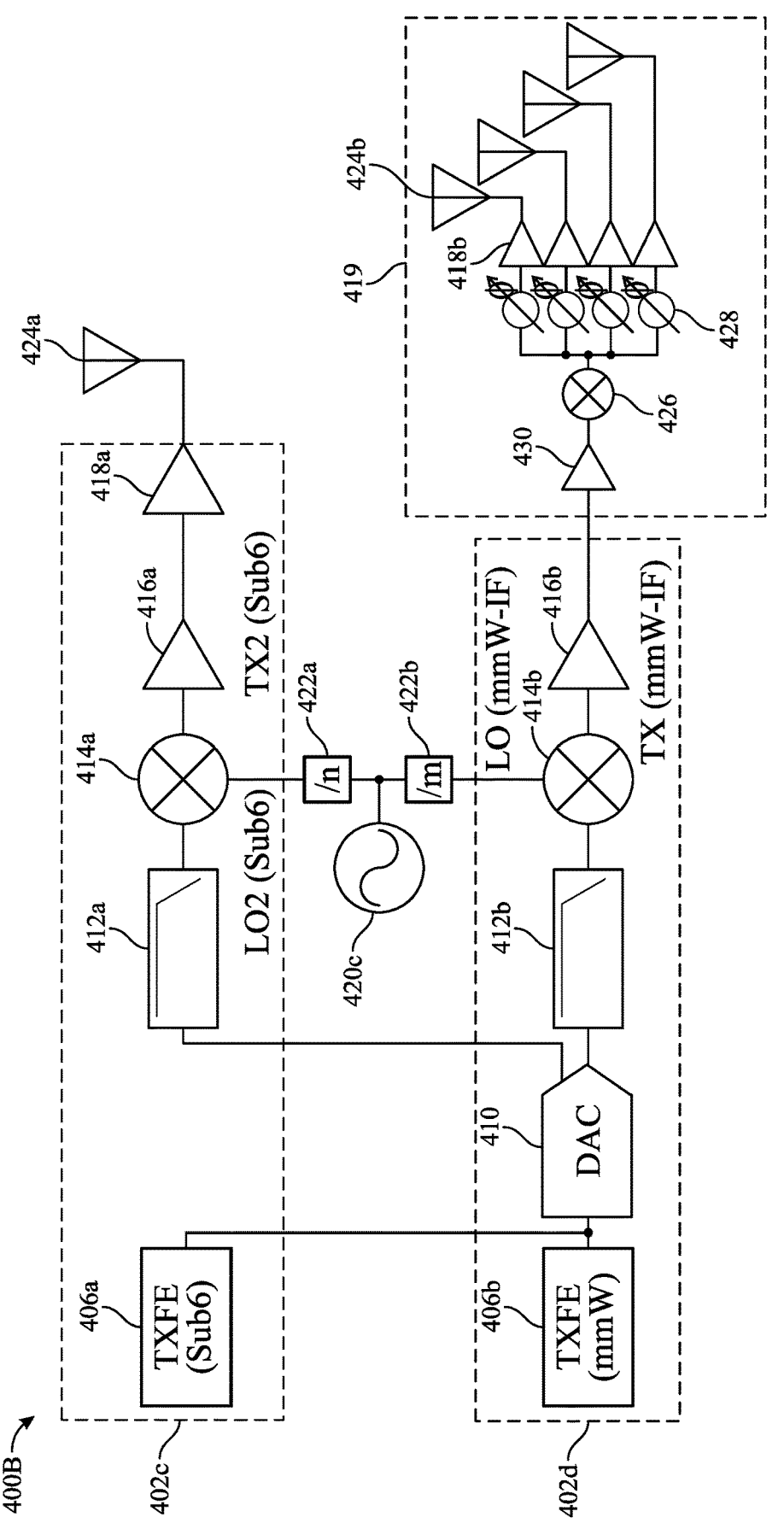
FIG. 4B is a block diagram of an example transmitter circuit with two transmit chains sharing a DAC and a frequency synthesizer, in accordance with certain aspects of the present disclosure.

FIG. 4B is a block diagram of an example transmitter circuit 400B with two transmit chains sharing a DAC and a frequency synthesizer, in accordance with certain aspects of the present disclosure.

The transmitter circuit 400B may include a TX chain 402c and a TX chain 402d. The transmitter circuit 400B may be similar to transmitter circuit 400A, and the TX chains 402c and 402d may be similar to the TX chains 402a and 402b, respectively. However, instead of each TX chain having its own TX frequency synthesizer (e.g., synthesizers 420a, 420b), the TX chain 402c and the TX chain 402d share a TX frequency synthesizer 420c. An output of the common TX frequency synthesizer 420c may be coupled to the second input of mixer 414a and the second input of mixer 414b. For certain aspects, a frequency divider 422a may be coupled between the output of the common TX frequency synthesizer 420c and the second input of mixer 414a. Independent of whether frequency divider 422a is included, certain aspects of the present disclosure may include a frequency divider 422b coupled between the output of common TX frequency synthesizer 420c and the second input of mixer 414b.

Furthermore, although FIG. 4B illustrates two TX chains sharing a common DAC 410 and TX frequency synthesizer 420c, the DAC 410 and/or the TX frequency synthesizer 420c may be shared between more than two TX paths, if these TX chains sharing the same DAC cannot be concurrently enabled.

Figure 4C:
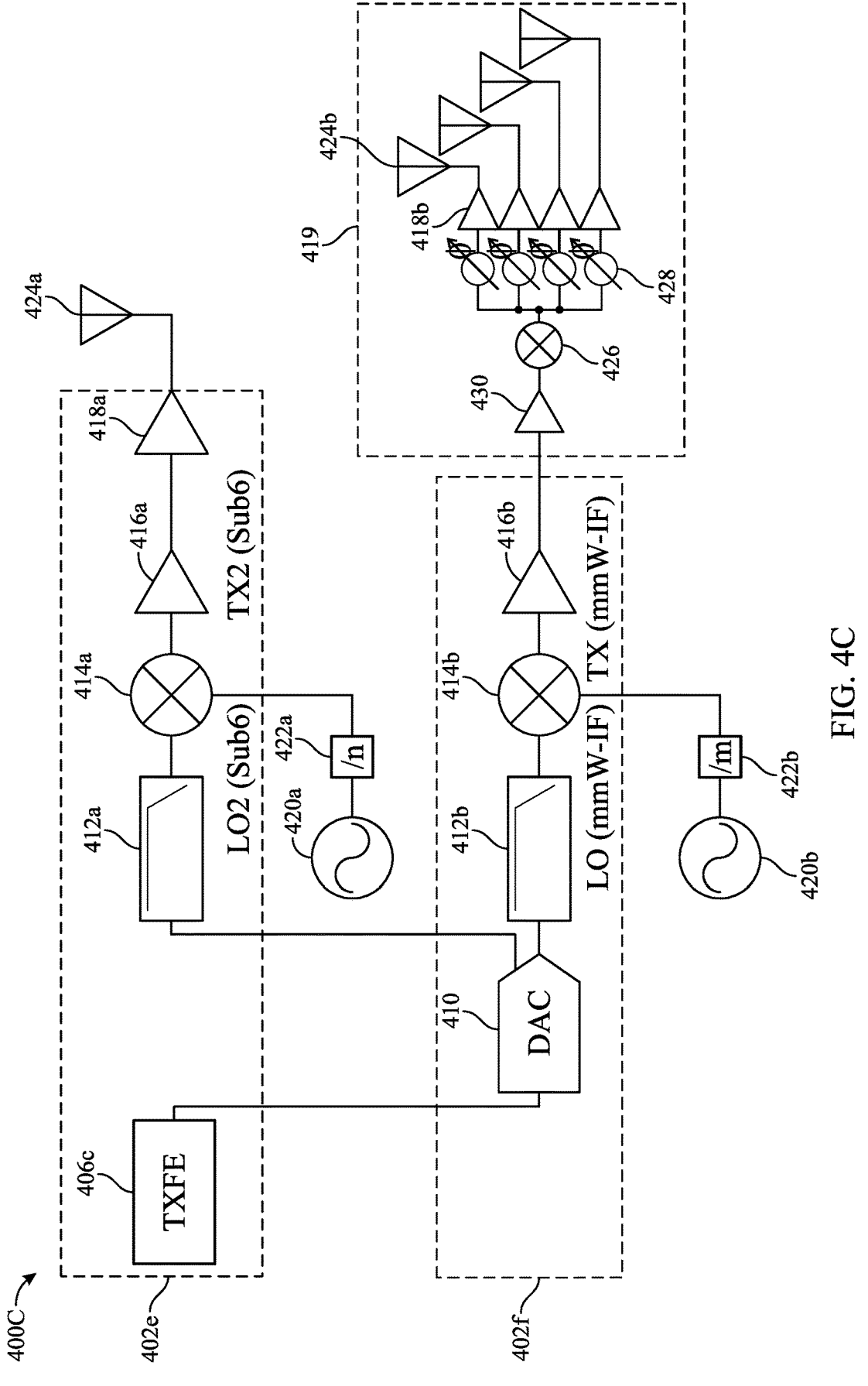
FIG. 4C is a block diagram of an example transmitter circuit with two transmit chains sharing a DAC and a baseband processor, in accordance with certain aspects of the present disclosure.

FIG. 4C is a block diagram of an example transmitter circuit 400C with two transmit chains sharing a DAC and a baseband processor, in accordance with certain aspects of the present disclosure.

The transmitter circuit 400C may include a TX chain 402e and a TX chain 402f. The transmitter circuit 400C may be similar to the transmitter circuit 400A, and the TX chains 402e and 402f may be similar to the TX chains 402a and 402b, respectively. However, instead of each TX chain having its own baseband processor (e.g., TXFEs 406a, 406b), the TX chain 402e and the TX chain 402f share a TXFE 406c. An output of the common TXFE 406c may be coupled to the input of the common DAC 410. Advantageously, because TX chain 402e and TX chain 402f may not be enabled at the same time, both TX chains can share the common DAC 410 and common TXFE 406c, reducing redundancies and saving chip space.

Furthermore, although FIG. 4C illustrates two TX chains sharing a common TXFE 406c and DAC 410, the TXFE 406c and the DAC 410 may be shared between more than two TX paths, if these TX chains sharing the same baseband processor and DAC cannot be concurrently enabled.

Figure 4D:
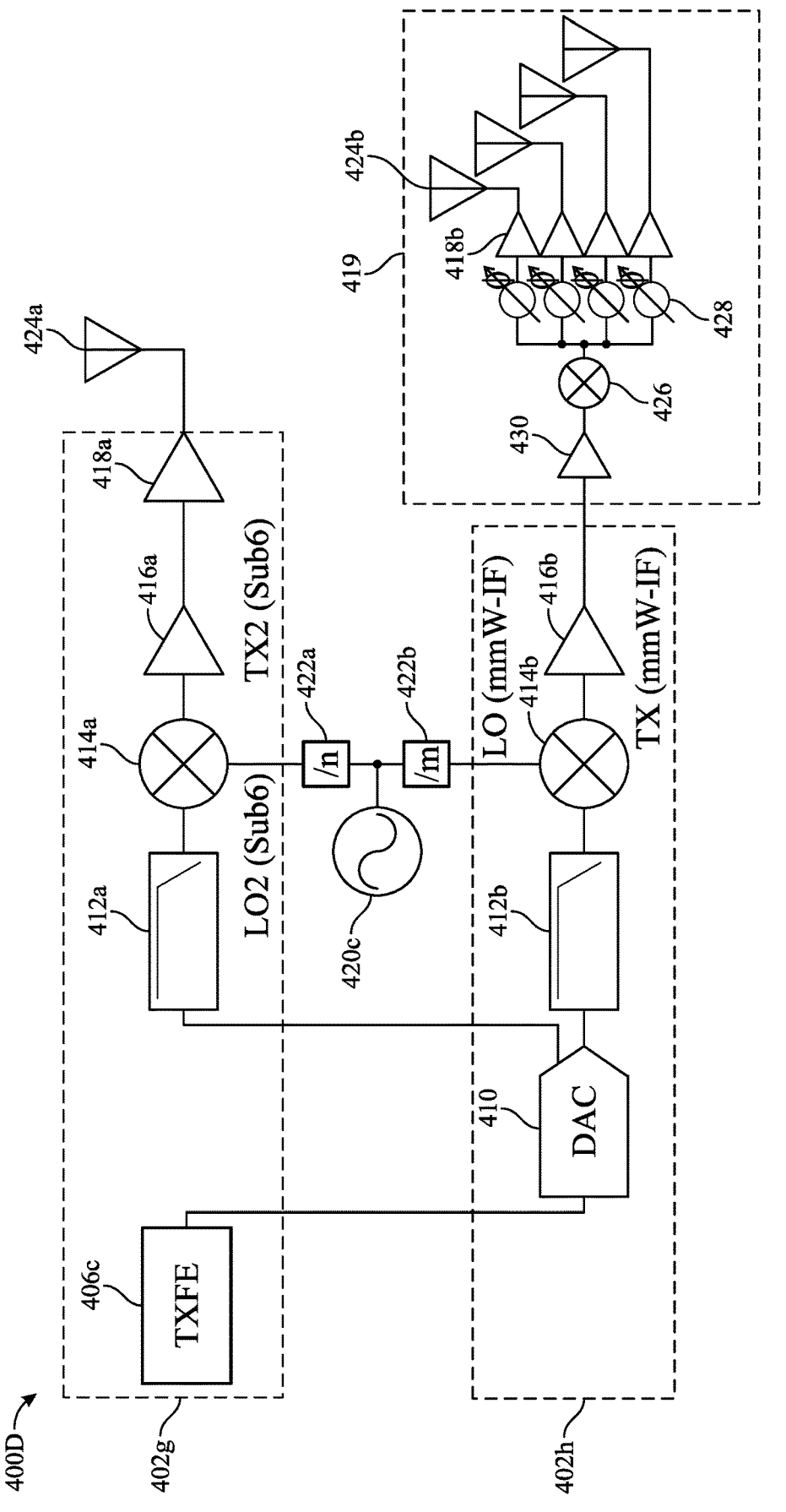
FIG. 4D is a block diagram of an example transmitter circuit with two transmit chains sharing a DAC, a frequency synthesizer, and a baseband processor, in accordance with certain aspects of the present disclosure.

FIG. 4D is a block diagram of an example transmitter circuit 400D with two transmit chains sharing a DAC, a frequency synthesizer, and a baseband processor, in accordance with certain aspects of the present disclosure.

The transmitter circuit 400D may include a TX chain 402g and a TX chain 402h. The transmitter circuit 400D may be similar to the transmitter circuit 400B, and the TX chains 402g and 402h may be similar to the TX chains 402c and 402d, respectively. However, instead of each TX chain having its own baseband processor (e.g., TXFEs 406a, 406b), the TX chain 402g and the TX chain 402h share a TXFE 406c, where an output of the common TXFE 406c may be coupled to the input of the common DAC 410. Advantageously, because TX chain 402g and TX chain 402h cannot be enabled at the same time, both TX chains can share the common DAC 410, common TX frequency synthesizer 420c, and common TXFE 406c reducing redundancies and saving chip space.

Furthermore, although FIG. 4D illustrates two TX chains sharing a common TXFE 406c, DAC 410, and TX frequency synthesizer 420c, the TXFE 406c, the DAC 410, and the TX frequency synthesizer 420c may be shared between more than two TX paths, if these TX chains sharing the same baseband processor and DAC cannot be concurrently enabled.

Figure 5A:
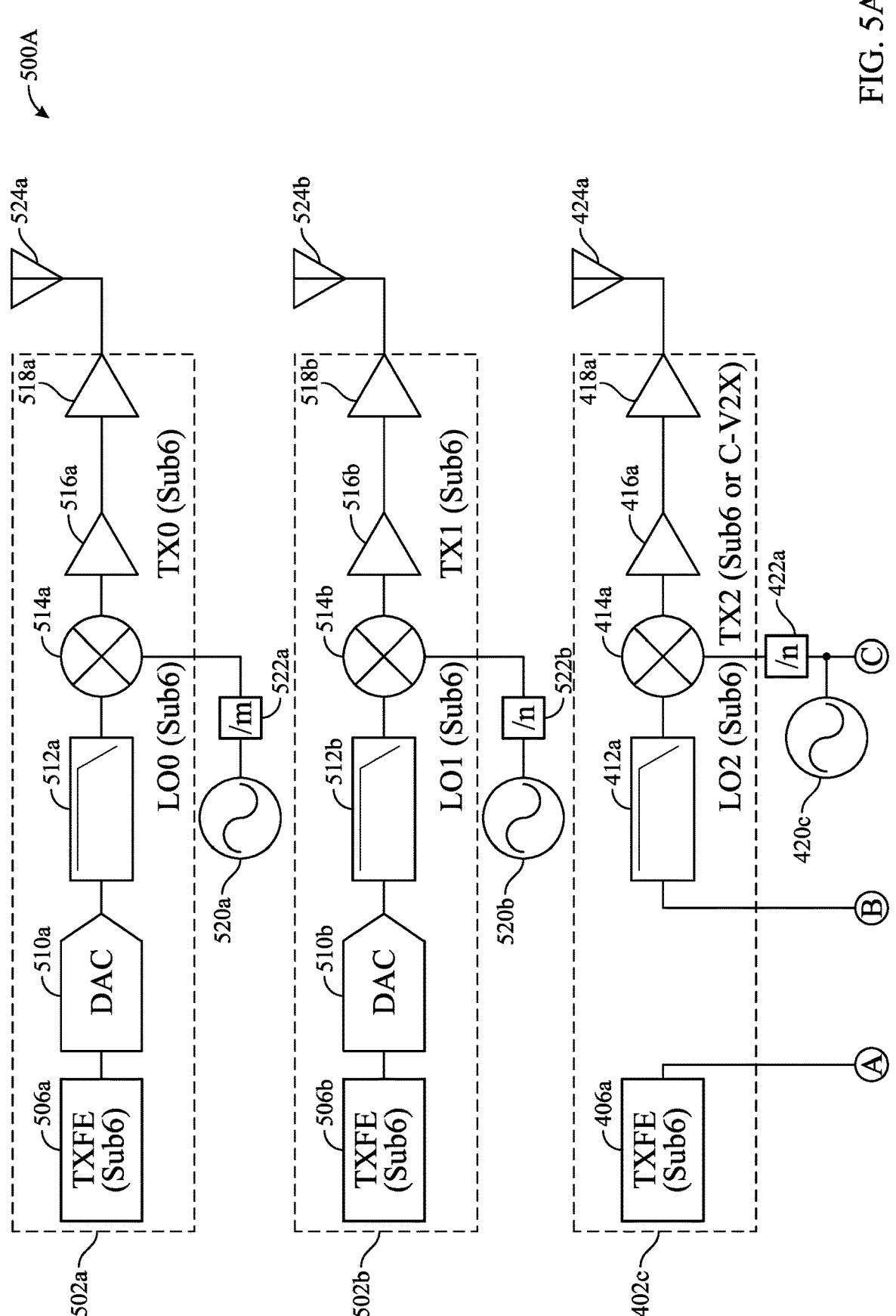
Figures 1, 5A:
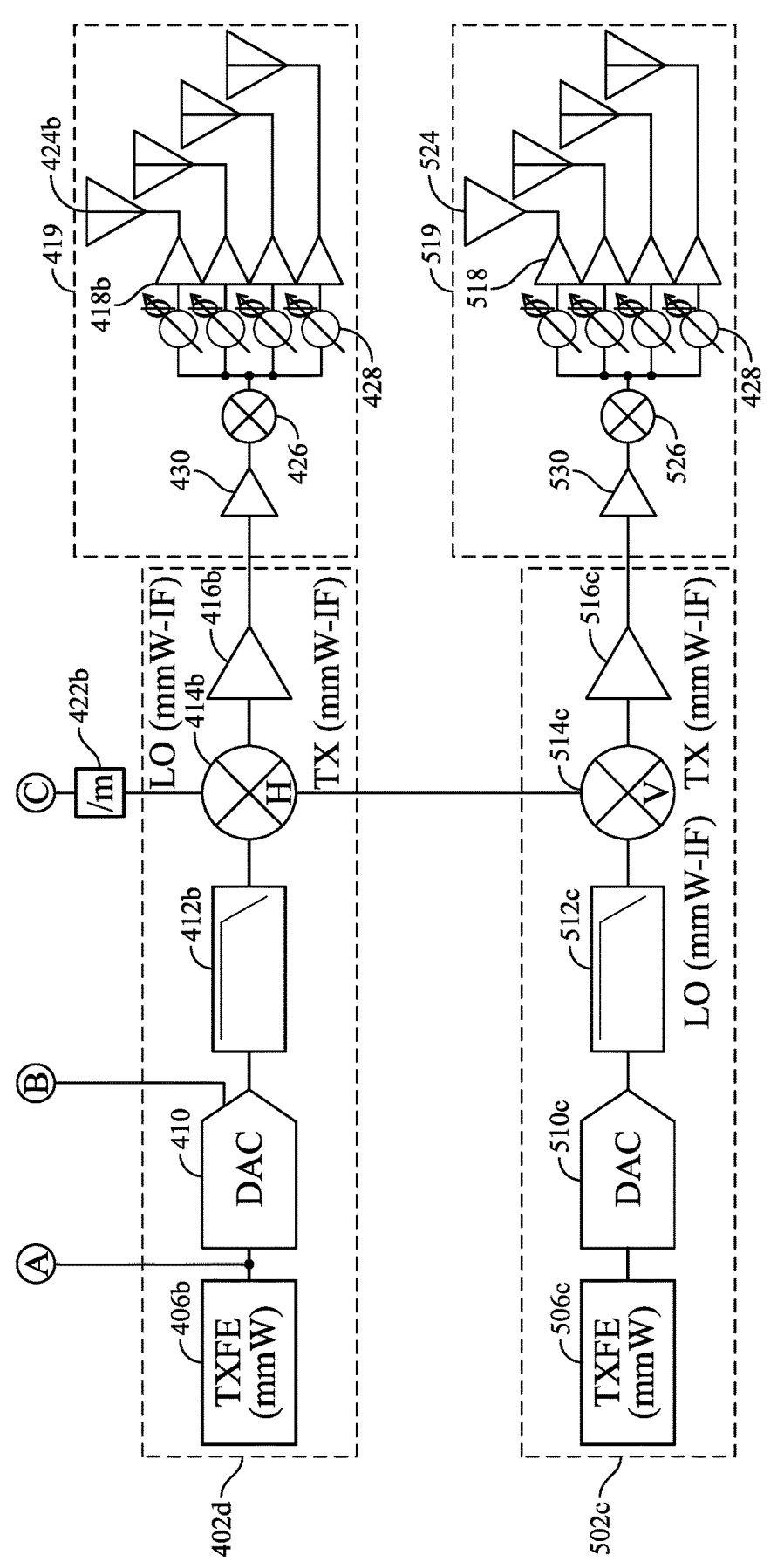

FIGS. 5A-5A-1 is a block diagram of an example transmitter circuit 500A with five transmit chains, where a Cellular Vehicle-to-Everything (C-V2X) transmit chain and a millimeter wave (mmW) transmit chain share a DAC and a frequency synthesizer, in accordance with certain aspects of the present disclosure.

The transmitter circuit 500A may be similar to transmitter circuit 400B with the addition of TX chain 502a, TX chain 502b, and TX chain 502c. In certain aspects, TX chain 502a and TX chain 502b may be sub-6 GHz TX chains that do not share circuit components. TX chain 502c may be a mmW TX path that does not share any circuit components with another TX path.

In this example, only four out of the five TX paths can be enabled simultaneously, and C-V2X TX paths and mmW TX paths cannot be simultaneously enabled. Therefore, providing individual dedicated elements in each of the five paths is redundant and a waste of chip space. Thus, as shown in FIGS. 5A-5A-1, a sub-6 GHz TX path (e.g., one designated for C-V2X) and a mmW TX path can share circuit components.

TX chain 502a may comprise a baseband processor (TXFE 506a), a DAC 510a, a BBF 512a, a mixer 514a, a DA 516a, and a PA 518a. The mixer 514a may receive a local oscillator (LO) signal from a TX frequency synthesizer 520a. The DAC 510a may be similar to the DAC 310, the BBF 512a may be similar to the BBF 312, the mixer 514a may be similar to the mixer 314, the DA 416a may be similar to the DA 316, the PA 418a may be similar to the PA 318, and the TX frequency synthesizer 520a may be similar to the TX frequency synthesizer 320.

The output of the TXFE 506a may be coupled to the input of the DAC 510a. The input of the BBF 512a may be coupled to the output of the DAC 510a, and the output of the BBF 512a may be coupled to a first input of the mixer 514a. The output of the TX frequency synthesizer 520a may be coupled to a second input of the mixer 514a. For certain aspects, a frequency divider 522a may be coupled between the TX frequency synthesizer 520a and the mixer 514a.

The output of the mixer 514a may be coupled to the input of the DA 516a. The output of the DA 516a may be coupled to the PA 518a, and the output of the PA 518a may be coupled to antenna 524a (e.g., via an interface, such as interface 308). The antenna 524a may be similar to antenna 306.

The TX chain 502b may include each of the electrical components arranged in the same manner as the TX chain 502a, and these components are similarly labeled.

As described above, to save chip space, a sub-6 GHz (or C-V2X) TX chain and a mmW TX chain can share one or more circuit element as both TX chains are not enabled simultaneously. For example, the transmitter circuit 500A may include TX chain 402c and TX chain 402d, which share a common DAC 410 and a common TX frequency synthesizer 420c. For certain aspects, TX chain 402c and TX chain 402d may also share a common TXFE 406c in the transmitter circuit 500A.

TX chain 502c may be similar to TX chain 402d, with similar components similarly labeled. Accordingly, TX chain 502c may comprise a TXFE 506c having an output coupled to a DAC 510c. An output of the DAC 510c may be coupled to an input of a BBF 512c. The output of the BBF 512c may be coupled to a first input of a mixer 514c, and an output of the TX frequency synthesizer 420c (or, more particularly, for certain aspects, an output of the frequency divider 422b) may be coupled to a second input of the mixer 514c. Thus, the TX frequency synthesizer 420c is shared between three TX chains 402c, 402d, and 502c in the transmitter circuit 500A. An output of the mixer 514c may be coupled to an input of a DA 516c. The output of the DA 516c may be coupled to a phased array 519. The phased array 519 may be similar to the phased array 419, with components similarly labeled.

Figure 5B:
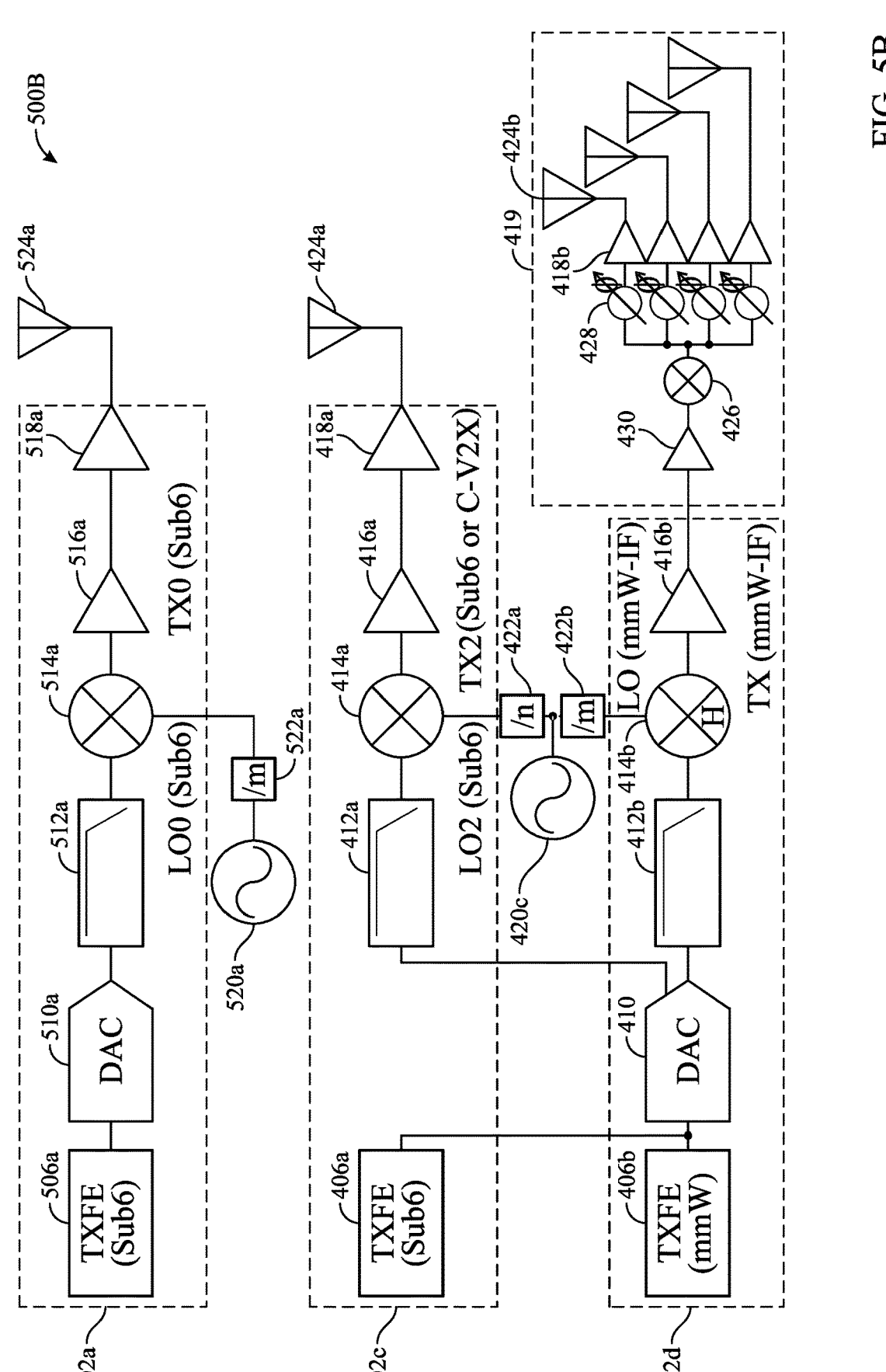
Figures 1, 5B:
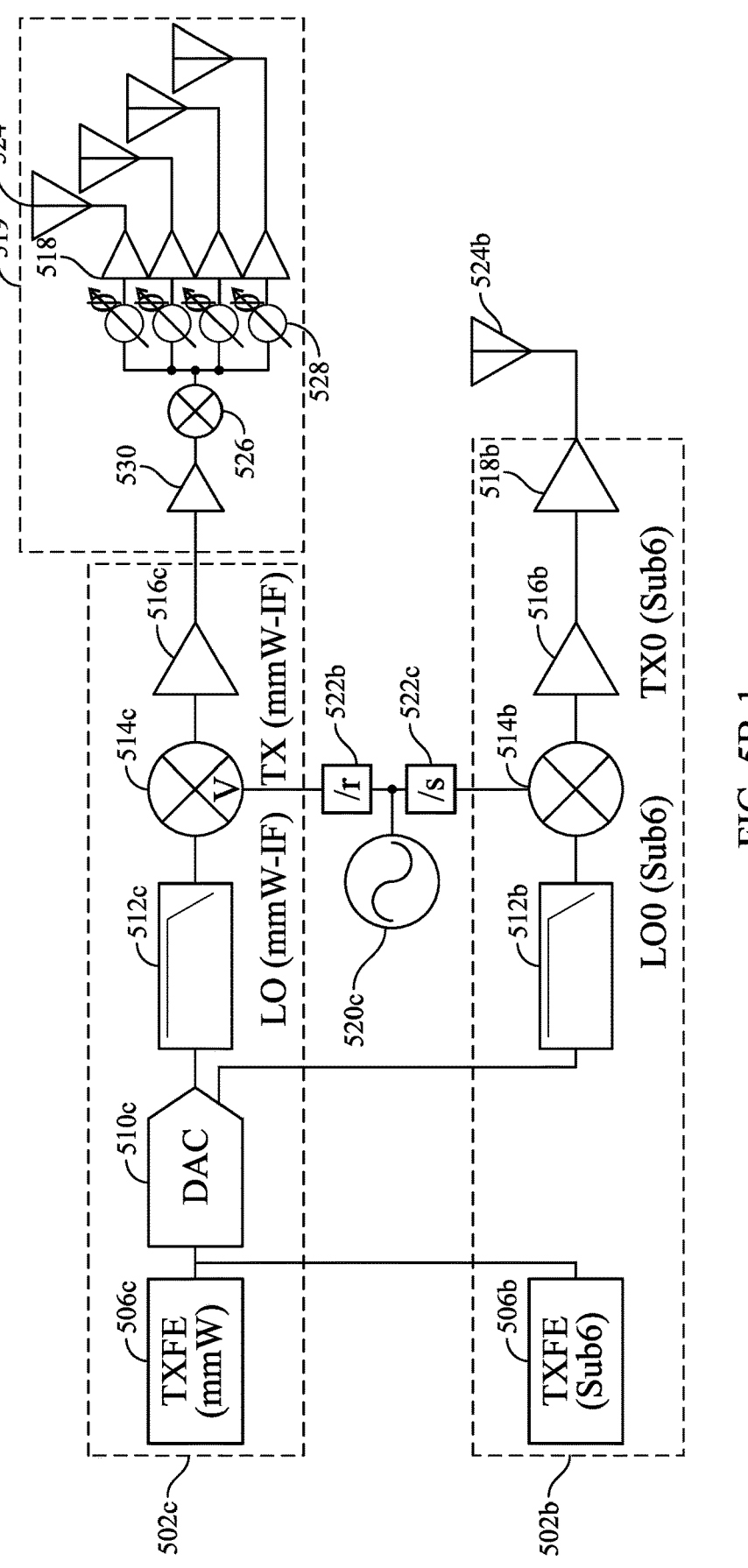

FIGS. 5B-5B-1 is a block diagram of an example transmitter circuit 500B with five transmit chains, where a C-V2X transmit chain and a mmW transmit chain share a DAC and a frequency synthesizer and where a sub-6 GHz transmit chain and another mmW transmit chain share another DAC and another frequency synthesizer, in accordance with certain aspects of the present disclosure.

Transmitter circuit 500B may be similar to transmitter circuit 500A, with the addition that TX chains 502b and 502c share a common DAC 510c and a common TX frequency synthesizer 520c, similar to TX chains 402c and 402d.

Example Operations for Wireless Communication

FIG. 6 is a flow diagram of example operations 600 for wireless communication, in accordance with certain aspects of the present disclosure. The operations 600 may be performed, for example, by a radio frequency (RF) transceiver (e.g., the transmitter circuits 400A-400D of FIGS. 4A-4D, transmitter circuit 500A of FIGS. 5A-5A-1, and transmitter circuit 500B of FIGS. 5B-5B-1) that utilizes shared circuit elements, as described above.

The operations 600 may begin, at block 602, with a digital-to-analog converter (DAC) (e.g., DAC 410, 510c) converting a first digital signal to a first analog signal. At block 604, a first transmit chain (e.g., TX chain 402a, 402c, 402e) may process the first analog signal to generate a first radio frequency (RF) signal for transmission. The DAC (the same DAC used at block 602) may convert a second digital signal to a second analog signal at block 606. At block 608, a second transmit chain (e.g., TX chain 402b, 402d, 402f) may process the second analog signal to generate a second RF signal for transmission. In other words, the first transmit chain and the second transmit chain share the DAC.

According to certain aspects, the first transmit chain and the second transmit chain share the DAC and a frequency synthesizer (e.g., TX frequency synthesizer 420c). The first transmit chain may include a first baseband filter (e.g., baseband filter 412a) and a first mixer (e.g., mixer 414a) In this case, processing the first analog signal at block 604 may involve: (1) the first baseband filter filtering the first analog signal to generate a first filtered analog signal and (2) the first mixer mixing the first filtered analog signal with a first oscillating signal (e.g., an LO signal) derived from the frequency synthesizer to generate a first preliminary RF signal. The first RF signal may be based on the first preliminary RF signal (e.g., a filtered and amplified version thereof). For certain aspects, the second transmit chain may include a second baseband filter (e.g., baseband filter 412b) and a second mixer (e.g., mixer 414b). In this case, processing the second analog signal at block 608 may involve: (1) the second baseband filter filtering the second analog signal to generate a second filtered analog signal and (2) the second mixer mixing the second filtered analog signal with a second oscillating signal derived from the frequency synthesizer to generate a second preliminary RF signal. The second RF signal may be based on the second preliminary RF signal.

According to certain aspects, the first transmit chain and the second transmit chain share the DAC, the frequency synthesizer, and a baseband processor (e.g., TXFE 406c). In this case, the operations 600 may further involve outputting the first digital signal from the baseband processor and outputting the second digital signal from the baseband processor.

According to certain aspects, the first transmit chain and the second transmit chain share the DAC and a baseband processor (e.g., TXFE 406c). In this case, the operations 600 may further involve outputting the first digital signal from the baseband processor and outputting the second digital signal from the baseband processor.

According to certain aspects, the operations 600 further involve transmitting the first RF signal at a first time and transmitting the second RF signal at a second time. The second time is different time than the first time. For certain aspects, the first and second RF signals are not (or cannot be) concurrently transmitted.

According to certain aspects, the first transmit chain and the second transmit chain support two different radio access technologies (RATs). For example, the first transmit chain may include a cellular vehicle-to-everything (C-V2X) transmit chain (e.g., TX chain 402c), and the second transmit chain may include a millimeter wave (mmW) transmit chain (e.g., TX chain 402d). As another example, the first transmit chain may include a sub-6 GHz transmit chain (e.g., TX chain 502b), and the second transmit chain may include a millimeter wave (mmW) transmit chain (e.g., TX chain 502c).

According to certain aspects, the operations 600 further involve another DAC (e.g., DAC 510c) converting a third digital signal to a third analog signal and a third transmit chain (e.g., TX chain 502b) processing the third analog signal to generate a third RF signal for transmission. In this case, the operations 600 may further involve the other DAC converting a fourth digital signal to a fourth analog signal and a fourth transmit chain (e.g., TX chain 502c) processing the fourth analog signal to generate a fourth RF signal for transmission. In other words, the third transmit chain and the fourth transmit chain share the other DAC. For certain aspects, the third transmit chain and the fourth transmit chain share the other DAC and a frequency synthesizer (e.g., TX frequency synthesizer 520c). As an example, the first transmit chain may include a cellular vehicle-to-everything (C-V2X) transmit chain (e.g., TX chain 402c); the second transmit chain may include a first millimeter wave (mmW) transmit chain (e.g., TX chain 402d); the third transmit chain may include a sub-6 GHz transmit chain (e.g., TX chain 502b); and the fourth transmit chain may include a second mmW transmit chain (e.g., TX chain 502c).

According to certain aspects, the operations 600 further involve: (1) the DAC converting a third digital signal to a third analog signal and (2) a third transmit chain (e.g., TX chain 502b) processing the third analog signal to generate a third RF signal for transmission. In this case, the first transmit chain, the second transmit chain, and the third transmit chain share the DAC.

EXAMPLE ASPECTS

In addition to the various aspects described above, specific combinations of aspects are within the scope of the present disclosure, some of which are detailed below:

Aspect 1: A transmitter circuit for wireless communications, comprising: a first transmit chain; and a second transmit chain, wherein the first transmit chain and the second transmit chain share a digital-to-analog converter (DAC).

Aspect 2: The transmitter circuit of Aspect 1, wherein the first transmit chain and the second transmit chain share the DAC and a frequency synthesizer.

Aspect 3: The transmitter circuit of Aspect 2, wherein: the first transmit chain comprises a first baseband filter and a first mixer, the first mixer having a first input coupled to an output of the first baseband filter; the second transmit chain comprises a second baseband filter and a second mixer, the second mixer having a first input coupled to an output of the second baseband filter; a first output of the DAC is coupled to an input of the first baseband filter; a second output of the DAC is coupled to an input of the second baseband filter; and an output of the frequency synthesizer is coupled to a second input of the first mixer and to a second input of the second mixer.

Aspect 4: The transmitter circuit of any of Aspects 1 to 3, wherein: the first transmit chain further comprises a first baseband processor having an output coupled to an input of the DAC; and the second transmit chain further comprises a second baseband processor having an output coupled to the input of the DAC.

Aspect 5: The transmitter circuit of Aspect 2 or 3, wherein the first transmit chain and the second transmit chain share the DAC, the frequency synthesizer, and a baseband processor having an output coupled to an input of the DAC.

Aspect 6: The transmitter circuit of Aspect 1, wherein the first transmit chain and the second transmit chain share the DAC and a baseband processor having an output coupled to an input of the DAC.

Aspect 7: The transmitter circuit of any of Aspects 1 to 6, wherein a first signal is configured to be output from the first transmit chain at a first time, wherein a second signal is configured to be output from the second transmit chain at a second time, and wherein the second time is different than the first time.

Aspect 8: The transmitter circuit of any of Aspects 1 to 7, wherein the first transmit chain comprises a cellular vehicle-to-everything (C-V2X) transmit chain and wherein the second transmit chain comprises a FR2 or millimeter wave transmit chain.

Aspect 9: The transmitter circuit of any of Aspects 1 to 7, wherein the first transmit chain comprises a FR1 or sub-6 GHz transmit chain and wherein the second transmit chain comprises a FR2 or millimeter wave transmit chain.

Aspect 10: The transmitter circuit of any of Aspects 1 to 9, further comprising: a third transmit chain; and a fourth transmit chain, wherein the third transmit chain and the fourth transmit chain are configured to share at least one of another DAC or a frequency synthesizer.

Aspect 11: The transmitter circuit of Aspect 10, wherein: the first transmit chain comprises a cellular vehicle-to-everything (C-V2X) transmit chain; the second transmit chain comprises a first FR2 or millimeter wave transmit chain; the third transmit chain comprises a FR1 or sub-6 GHz transmit chain; and the fourth transmit chain comprises a second FR2 or millimeter wave transmit chain.

Aspect 12: The transmitter circuit of any of Aspects 1 to 9, further comprising one or more additional transmit chains, wherein a total number of transmit chains in the transmitter circuit is greater than a number of transmit chains from which signals can be concurrently transmitted.

Aspect 13: The transmitter circuit of any of Aspects 1 to 9, further comprising at least one additional transmit chain, wherein the first transmit chain, the second transmit chain, and the at least one additional transmit chain share the DAC.

Aspect 14: The transmitter circuit of any of Aspects 1 to 13, wherein the first transmit chain and the second transmit chain support two different radio access technologies (RATs).

Aspect 15: A method of wireless communication, comprising: converting a first digital signal to a first analog signal using a digital-to-analog converter (DAC); processing the first analog signal using a first transmit chain to generate a first radio frequency (RF) signal for transmission; converting a second digital signal to a second analog signal using the DAC; and processing the second analog signal using a second transmit chain to generate a second RF signal for transmission, wherein the first transmit chain and the second transmit chain share the DAC.

Aspect 16: The method of Aspect 15, wherein the first transmit chain and the second transmit chain share the DAC and a frequency synthesizer.

Aspect 17: The method of Aspect 16, wherein: the first transmit chain comprises a first baseband filter and a first mixer; processing the first analog signal comprises: filtering the first analog signal with the first baseband filter to generate a first filtered analog signal; and mixing, with the first mixer, the first filtered analog signal with a first oscillating signal derived from the frequency synthesizer to generate a first preliminary RF signal, the first RF signal being based on the first preliminary RF signal; the second transmit chain comprises a second baseband filter and a second mixer; and processing the second analog signal comprises: filtering the second analog signal with the second baseband filter to generate a second filtered analog signal; and mixing, with the second mixer, the second filtered analog signal with a second oscillating signal derived from the frequency synthesizer to generate a second preliminary RF signal, the second RF signal being based on the second preliminary RF signal.

Aspect 18: The method of Aspect 16 or 17, wherein: the first transmit chain and the second transmit chain share the DAC, the frequency synthesizer, and a baseband processor; and the method further comprises: outputting the first digital signal from the baseband processor; and outputting the second digital signal from the baseband processor.

Aspect 19: The method of Aspect 15, wherein: the first transmit chain and the second transmit chain share the DAC and a baseband processor; and the method further comprises: outputting the first digital signal from the baseband processor; and outputting the second digital signal from the baseband processor.

Aspect 20: The method of any of Aspects 15 to 19, further comprising: transmitting the first RF signal at a first time; and transmitting the second RF signal at a second time, wherein the second time is different than the first time.

Aspect 21: The method of any of Aspects 15 to 20, wherein the first transmit chain comprises a cellular vehicle-to-everything (C-V2X) transmit chain and wherein the second transmit chain comprises a FR2 or millimeter wave transmit chain.

Aspect 22: The method of any of Aspects 15 to 20, wherein the first transmit chain comprises a FR1 or sub-6 GHz transmit chain and wherein the second transmit chain comprises a FR2 or millimeter wave transmit chain.

Aspect 23: The method of any of Aspects 15 to 22, further comprising: converting a third digital signal to a third analog signal using another DAC; processing the third analog signal using a third transmit chain to generate a third RF signal for transmission; converting a fourth digital signal to a fourth analog signal using the other DAC; and processing the fourth analog signal using a fourth transmit chain to generate a fourth RF signal for transmission, wherein the third transmit chain and the fourth transmit chain share the other DAC.

Aspect 24: The method of Aspect 23, wherein the third transmit chain and the fourth transmit chain share the other DAC and a frequency synthesizer.

Aspect 25: The method of Aspect 23 or 24, wherein: the first transmit chain comprises a cellular vehicle-to-everything (C-V2X) transmit chain; the second transmit chain comprises a first FR2 or millimeter wave transmit chain; the third transmit chain comprises a FR1 or sub-6 GHz transmit chain; and the fourth transmit chain comprises a second FR2 or millimeter wave transmit chain.

Aspect 26: The method of any of Aspects 15 to 22, further comprising: converting a third digital signal to a third analog signal using the DAC; and processing the third analog signal using a third transmit chain to generate a third RF signal for transmission, wherein the first transmit chain, the second transmit chain, and the third transmit chain share the DAC.

Aspect 27: The method of any of Aspects 15 to 26, wherein the first transmit chain and the second transmit chain support two different radio access technologies (RAT s).

Aspect 28: An apparatus for wireless communications, comprising: means for converting a first digital signal to a first analog signal and a second digital signal to a second analog signal; first means for processing the first analog signal to generate a first radio frequency (RF) signal for transmission from the apparatus; and second means for processing the second analog signal to generate a second RF signal for transmission from the apparatus, wherein the first means for processing and the second means for processing share the means for converting.

Aspect 29: The apparatus of Aspect 28, wherein the first means for processing and the second means for processing share the means for converting and means for generating an oscillating signal.

Aspect 30: The apparatus of Aspect 28 or 29, wherein the first RF signal is configured to be transmitted at a first time, wherein the second RF signal is configured to be transmitted at a second time, and wherein the second time is different than the first time.

ADDITIONAL CONSIDERATIONS

The above description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function components. For example, means for converting may include a digital-to-analog converter (DAC), such as the DAC 410 of FIGS. 4A-4D, FIGS. 5A-5A-1, or FIGS. 5B-5B-1. First means for processing and/or second means for processing may include a portion of a transmit chain, such as a portion of the transmit chain 402a (or 402b) after the DAC 410, which may include a baseband filter 412a (or 412b), a mixer 414a (or 414b), and an amplifier (e.g., DA 416a and/or PA 418a (or DA 416b and/or PA 418b)) of FIGS. 4A-4D, FIGS. 5A-5A-1, or FIGS. 5B-5B-1. Means for generating an oscillating signal may include a frequency synthesizer, such as the TX frequency synthesizer 420c of FIG. 4D.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the claims are not limited to the precise configuration and components illustrated above. Various modifications, changes, and variations may be made in the arrangement, operation, and details of the methods and apparatus described above without departing from the scope of the claims.

The invention claimed is:

1. A transmitter circuit for wireless communications, comprising:
   a first transmit chain configured to support a first radio access technology (RAT); and
   a second transmit chain configured to support a second RAT different from the first RAT, wherein the first transmit chain and the second transmit chain share a digital-to-analog converter (DAC) and wherein the DAC is configured to output a first signal associated with the first RAT at a first time and a second signal associated with the second RAT at a second time different than the first time.

2. The transmitter circuit of claim 1, wherein the first transmit chain and the second transmit chain share the DAC and a frequency synthesizer.

3. The transmitter circuit of claim 2, wherein:
   the first transmit chain comprises a first baseband filter and a first mixer, the first mixer having a first input coupled to an output of the first baseband filter;
   the second transmit chain comprises a second baseband filter and a second mixer, the second mixer having a first input coupled to an output of the second baseband filter;
   a first output of the DAC is coupled to an input of the first baseband filter;
   a second output of the DAC is coupled to an input of the second baseband filter; and
   an output of the frequency synthesizer is coupled to a second input of the first mixer and to a second input of the second mixer.

4. The transmitter circuit of claim 3, wherein:
   the first transmit chain further comprises a first baseband processor having an output coupled to an input of the DAC; and
   the second transmit chain further comprises a second baseband processor having an output coupled to the input of the DAC.

5. The transmitter circuit of claim 2, wherein the first transmit chain and the second transmit chain share the DAC, the frequency synthesizer, and a baseband processor having an output coupled to an input of the DAC.

6. The transmitter circuit of claim 1, wherein the first transmit chain and the second transmit chain share the DAC and a baseband processor having an output coupled to an input of the DAC.

7. The transmitter circuit of claim 1, wherein a third signal is configured to be output from the first transmit chain at a third time, wherein a fourth signal is configured to be output from the second transmit chain at a fourth time, and wherein the fourth time is different than the third time.

8. The transmitter circuit of claim 1, wherein the first transmit chain comprises a cellular vehicle-to-everything (C-V2X) transmit chain and wherein the second transmit chain comprises a FR2 or millimeter wave transmit chain.

9. The transmitter circuit of claim 1, wherein the first transmit chain comprises a FR1 or sub-6 GHz transmit chain and wherein the second transmit chain comprises a FR2 or millimeter wave transmit chain.

10. The transmitter circuit of claim 1, further comprising:
a third transmit chain; and
a fourth transmit chain, wherein the third transmit chain and the fourth transmit chain are configured to share at least one of another DAC or a frequency synthesizer.

11. The transmitter circuit of claim 10, wherein:
the first transmit chain comprises a cellular vehicle-to-everything (C-V2X) transmit chain;
the second transmit chain comprises a first FR2 or millimeter wave transmit chain;
the third transmit chain comprises a FR1 or sub-6 GHz transmit chain; and
the fourth transmit chain comprises a second FR2 or millimeter wave transmit chain.

12. The transmitter circuit of claim 1, further comprising one or more additional transmit chains, wherein a total number of transmit chains in the transmitter circuit is greater than a number of transmit chains from which signals can be concurrently transmitted.

13. The transmitter circuit of claim 1, further comprising at least one additional transmit chain, wherein the first transmit chain, the second transmit chain, and the at least one additional transmit chain share the DAC.

14. A method of wireless communication, comprising:
converting a first digital signal to a first analog signal associated with a first radio access technology (RAT) at a first time using a digital-to-analog converter (DAC);
processing the first analog signal using a first transmit chain that supports the first RAT to generate a first radio frequency (RF) signal for transmission;
converting a second digital signal to a second analog signal associated with a second RAT at a second time using the DAC, the second RAT being different from the first RAT and the second time being different than the first time; and
processing the second analog signal using a second transmit chain that supports the second RAT to generate a second RF signal for transmission, wherein the first transmit chain and the second transmit chain share the DAC.

15. The method of claim 14, wherein the first transmit chain and the second transmit chain share the DAC and a frequency synthesizer.

16. The method of claim 15, wherein:
the first transmit chain comprises a first baseband filter and a first mixer;
processing the first analog signal comprises:
filtering the first analog signal with the first baseband filter to generate a first filtered analog signal; and
mixing, with the first mixer, the first filtered analog signal with a first oscillating signal derived from the frequency synthesizer to generate a first preliminary RF signal, the first RF signal being based on the first preliminary RF signal;
the second transmit chain comprises a second baseband filter and a second mixer; and processing the second analog signal comprises:
filtering the second analog signal with the second baseband filter to generate a second filtered analog signal; and
mixing, with the second mixer, the second filtered analog signal with a second oscillating signal derived from the frequency synthesizer to generate a second preliminary RF signal, the second RF signal being based on the second preliminary RF signal.

17. The method of claim 15, wherein:
the first transmit chain and the second transmit chain share the DAC, the frequency synthesizer, and a baseband processor; and
the method further comprises:
outputting the first digital signal from the baseband processor; and
outputting the second digital signal from the baseband processor.

18. The method of claim 14, wherein:
the first transmit chain and the second transmit chain share the DAC and a baseband processor; and
the method further comprises:
outputting the first digital signal from the baseband processor; and
outputting the second digital signal from the baseband processor.

19. The method of claim 14, further comprising:
transmitting the first RF signal at a third time; and
transmitting the second RF signal at a fourth time, wherein the fourth time is different than the third time.

20. The method of claim 14, wherein the first transmit chain comprises a cellular vehicle-to-everything (C-V2X) transmit chain and wherein the second transmit chain comprises a FR2 or millimeter wave transmit chain.

21. The method of claim 14, wherein the first transmit chain comprises a FR1 or sub-6 GHz transmit chain and wherein the second transmit chain comprises a FR2 or millimeter wave transmit chain.

22. The method of claim 14, further comprising:
converting a third digital signal to a third analog signal using another DAC;
processing the third analog signal using a third transmit chain to generate a third RF signal for transmission;
converting a fourth digital signal to a fourth analog signal using the other DAC; and
processing the fourth analog signal using a fourth transmit chain to generate a fourth RF signal for transmission, wherein the third transmit chain and the fourth transmit chain share the other DAC.

23. The method of claim 22, wherein the third transmit chain and the fourth transmit chain share the other DAC and a frequency synthesizer.

24. The method of claim 22, wherein:
the first transmit chain comprises a cellular vehicle-to-everything (C-V2X) transmit chain;
the second transmit chain comprises a first FR2 or millimeter wave transmit chain;
the third transmit chain comprises a FR1 or sub-6 GHz transmit chain; and
the fourth transmit chain comprises a second FR2 or millimeter wave transmit chain.

25. The method of claim 14, further comprising:
converting a third digital signal to a third analog signal using the DAC; and
processing the third analog signal using a third transmit chain to generate a third RF signal for transmission, wherein the first transmit chain, the second transmit chain, and the third transmit chain share the DAC.

* * * * *